(12) United States Patent
Boedicker

(10) Patent No.: US 9,829,201 B2
(45) Date of Patent: Nov. 28, 2017

(54) OVEN APPLIANCE AND A METHOD FOR OPERATING AN OVEN APPLIANCE

(71) Applicant: General Electric Company, Schenectady, NY (US)

(72) Inventor: Stephen Christopher Boedicker, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 522 days.

(21) Appl. No.: 14/599,715

(22) Filed: Jan. 19, 2015

(65) Prior Publication Data

US 2016/0209050 A1 Jul. 21, 2016

(51) Int. Cl.
| | | |
|---|---|---|
| F24C 15/32 | (2006.01) | |
| F24C 7/08 | (2006.01) | |
| F24C 1/14 | (2006.01) | |
| F24C 3/12 | (2006.01) | |
| A47J 37/01 | (2006.01) | |

(52) U.S. Cl.
CPC ............ *F24C 15/322* (2013.01); *F24C 7/085* (2013.01); *A47J 37/01* (2013.01); *F24C 1/14* (2013.01); *F24C 3/124* (2013.01); *Y02B 40/166* (2013.01)

(58) Field of Classification Search
CPC .......... F24C 15/322; F24C 7/085; F24C 1/14; F24C 3/124; A47J 37/01; Y02B 40/166
USPC ...... 126/21 A, 273 R; 99/330, 327, 468, 474
See application file for complete search history.

(56) References Cited

U.S. PATENT DOCUMENTS

| | | | | | |
|---|---|---|---|---|---|
| 5,814,794 | A | * | 9/1998 | Lim | ...................... H05B 6/6435 |
| | | | | | 126/21 A |
| 5,832,812 | A | * | 11/1998 | Wolfe | ..................... A21B 1/245 |
| | | | | | 126/21 A |
| 5,880,436 | A | * | 3/1999 | Keogh | .................. F24C 15/322 |
| | | | | | 126/197 |
| 7,012,219 | B2 | * | 3/2006 | Kim | ...................... F24C 15/325 |
| | | | | | 126/21 A |
| 8,692,162 | B2 | | 4/2014 | Elston et al. | |
| 2003/0000514 | A1 | * | 1/2003 | Cole | ........................ A21B 1/26 |
| | | | | | 126/21 A |
| 2003/0000515 | A1 | * | 1/2003 | Cole | ........................ A21B 1/26 |
| | | | | | 126/21 A |
| 2008/0066661 | A1 | * | 3/2008 | Berkenkoetter | ........ F24C 7/087 |
| | | | | | 110/162 |
| 2009/0250451 | A1 | * | 10/2009 | Blackson | ............... F24C 15/322 |
| | | | | | 219/400 |
| 2010/0092625 | A1 | * | 4/2010 | Finch | ..................... G06Q 50/06 |
| | | | | | 426/231 |

(Continued)

FOREIGN PATENT DOCUMENTS

| | | | | | |
|---|---|---|---|---|---|
| JP | | 59018321 A | * | 1/1984 | ............ F24C 15/322 |
| SE | EP2896893 A1 | * | 7/2015 | ............ F24C 15/322 |
| WO | WO 2011080087 | | 7/2011 | |

*Primary Examiner* — Gregory Huson
*Assistant Examiner* — Daniel E Namay
(74) *Attorney, Agent, or Firm* — Dority & Manning, P.A.

(57) ABSTRACT

An oven appliance with one or more features for controlling airflow within a cooking chamber of the oven appliance. Further, a method for operating an oven appliance to control airflow within a cooking chamber of the oven appliance. In particular, the oven includes features for and the method includes steps for dynamic control of the speed of a convection fan over an oven cycle to maintain proper airflow within the cooking chamber for cooking performance of the cooking chamber.

19 Claims, 4 Drawing Sheets

(56) References Cited

U.S. PATENT DOCUMENTS

| | | | | |
|---|---|---|---|---|
| 2010/0139641 A1* | 6/2010 | Distaso | ............... | F24C 15/2007 126/21 R |
| 2013/0202761 A1* | 8/2013 | McKee | ................... | F24C 7/088 426/523 |
| 2015/0004296 A1* | 1/2015 | Deming | ................... | A21B 3/04 426/496 |

* cited by examiner

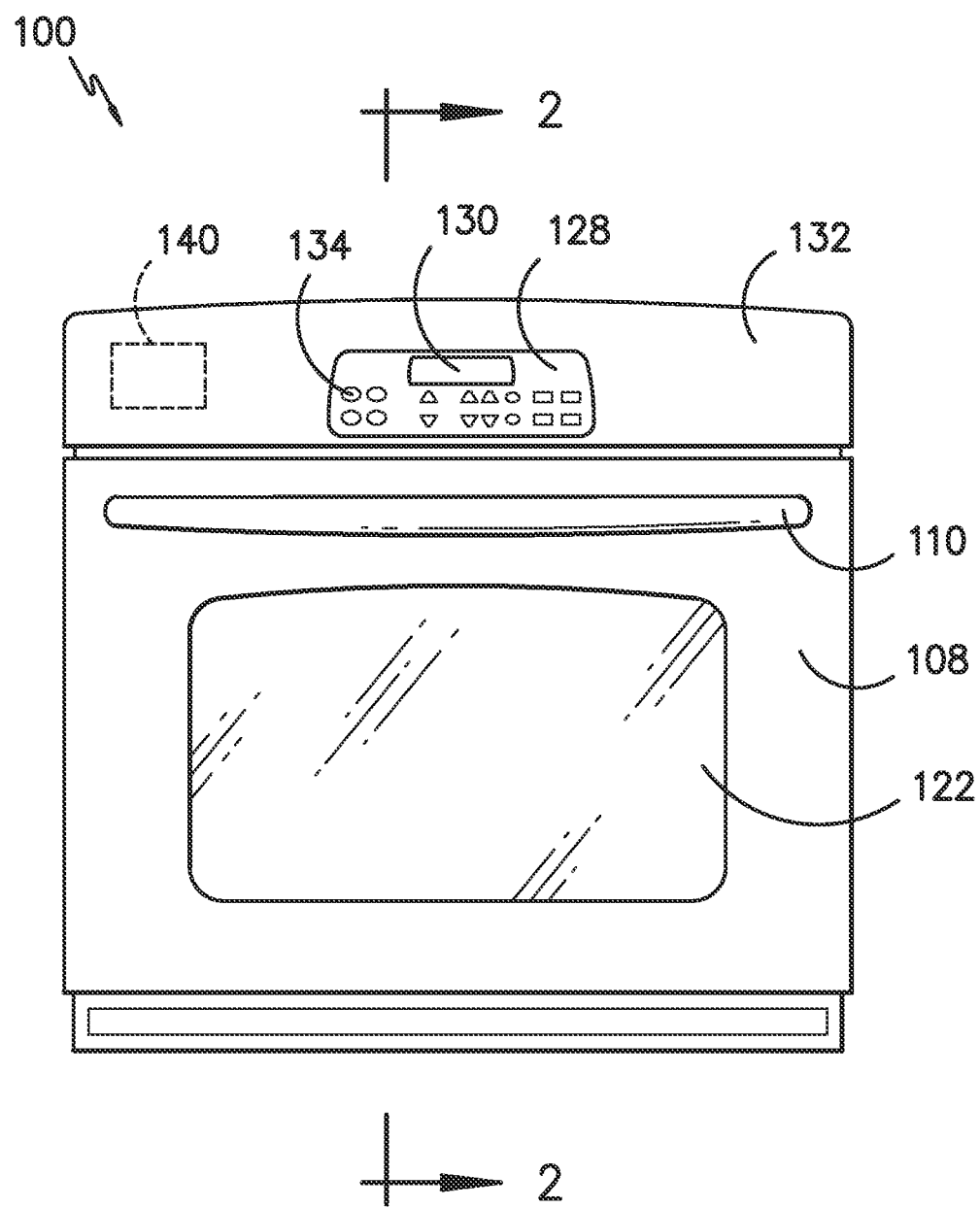
FIG. -1-

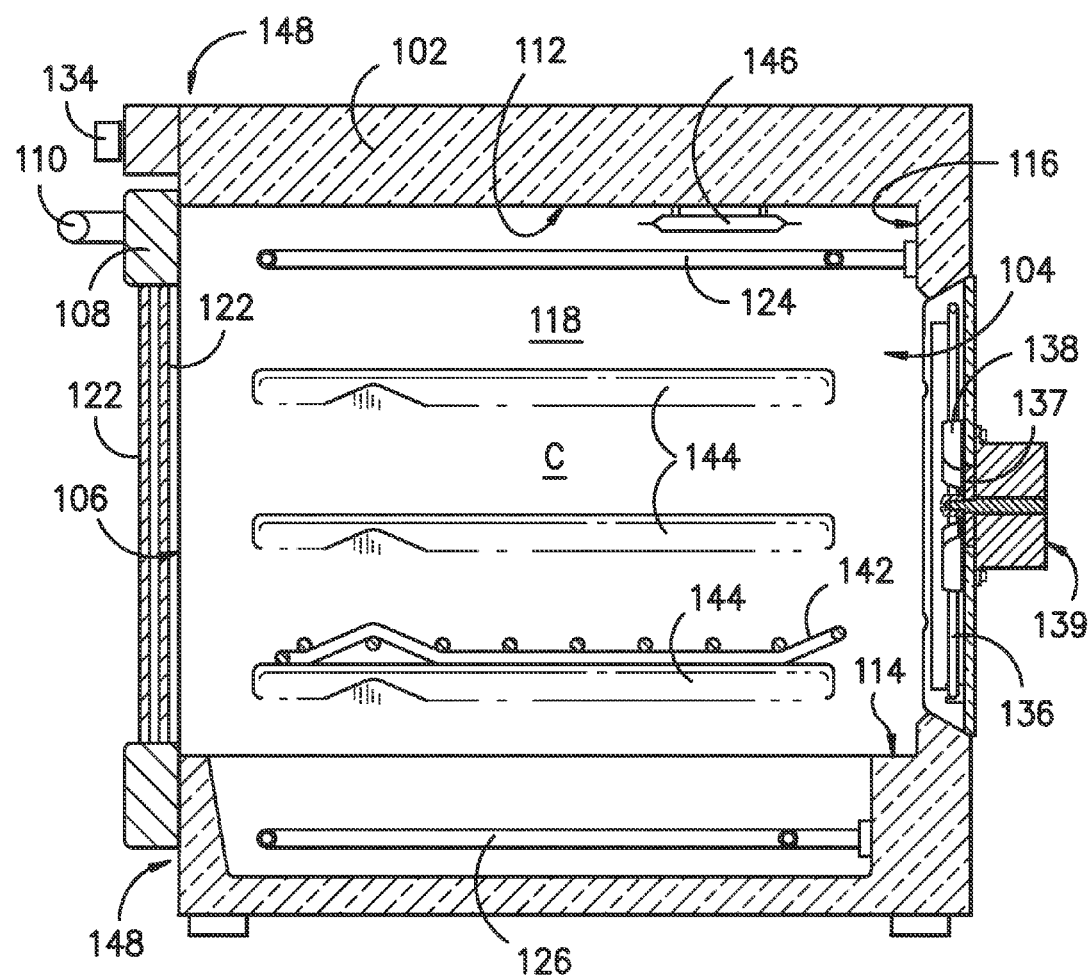
FIG. -2-

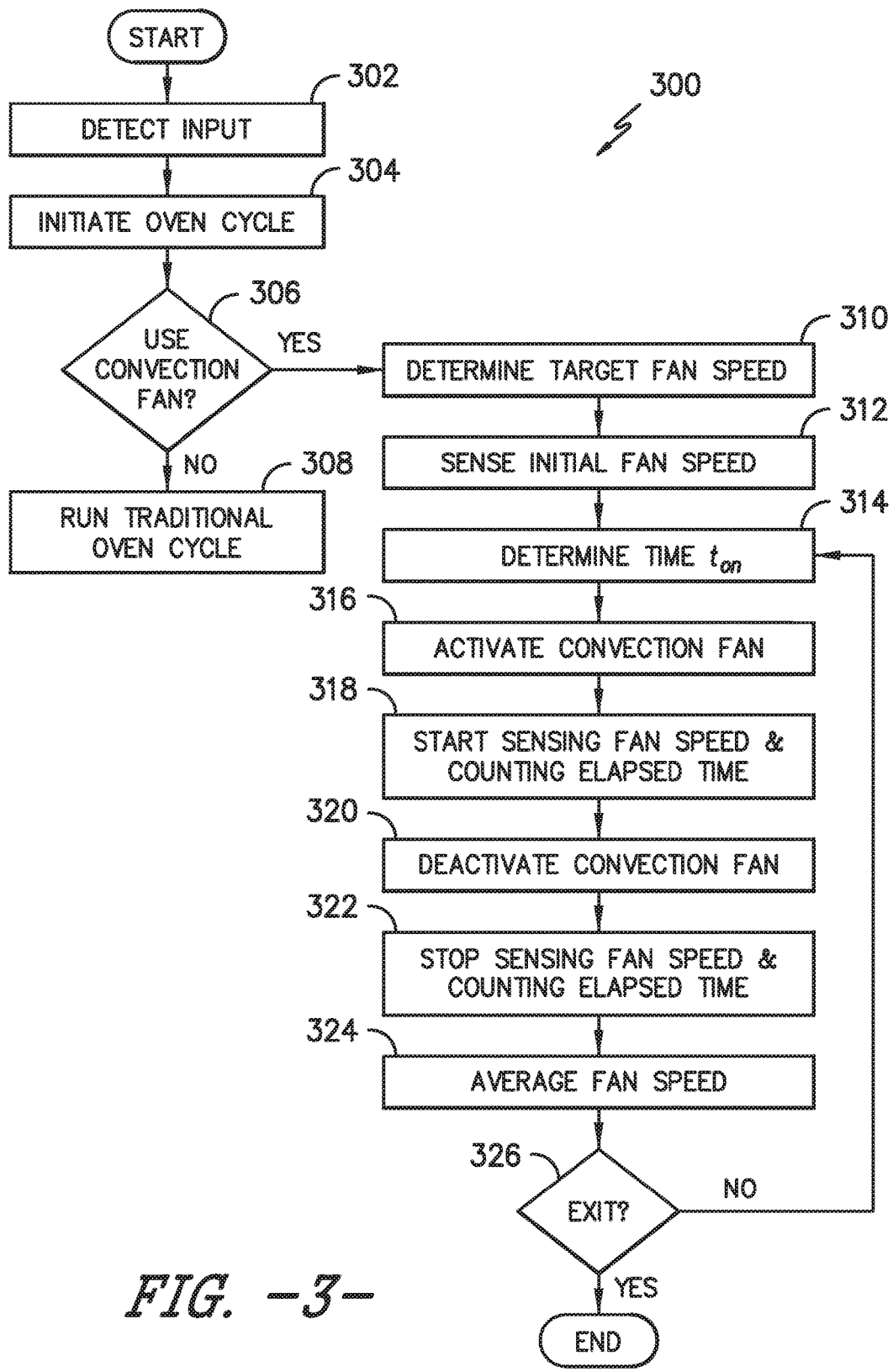
FIG. -3-

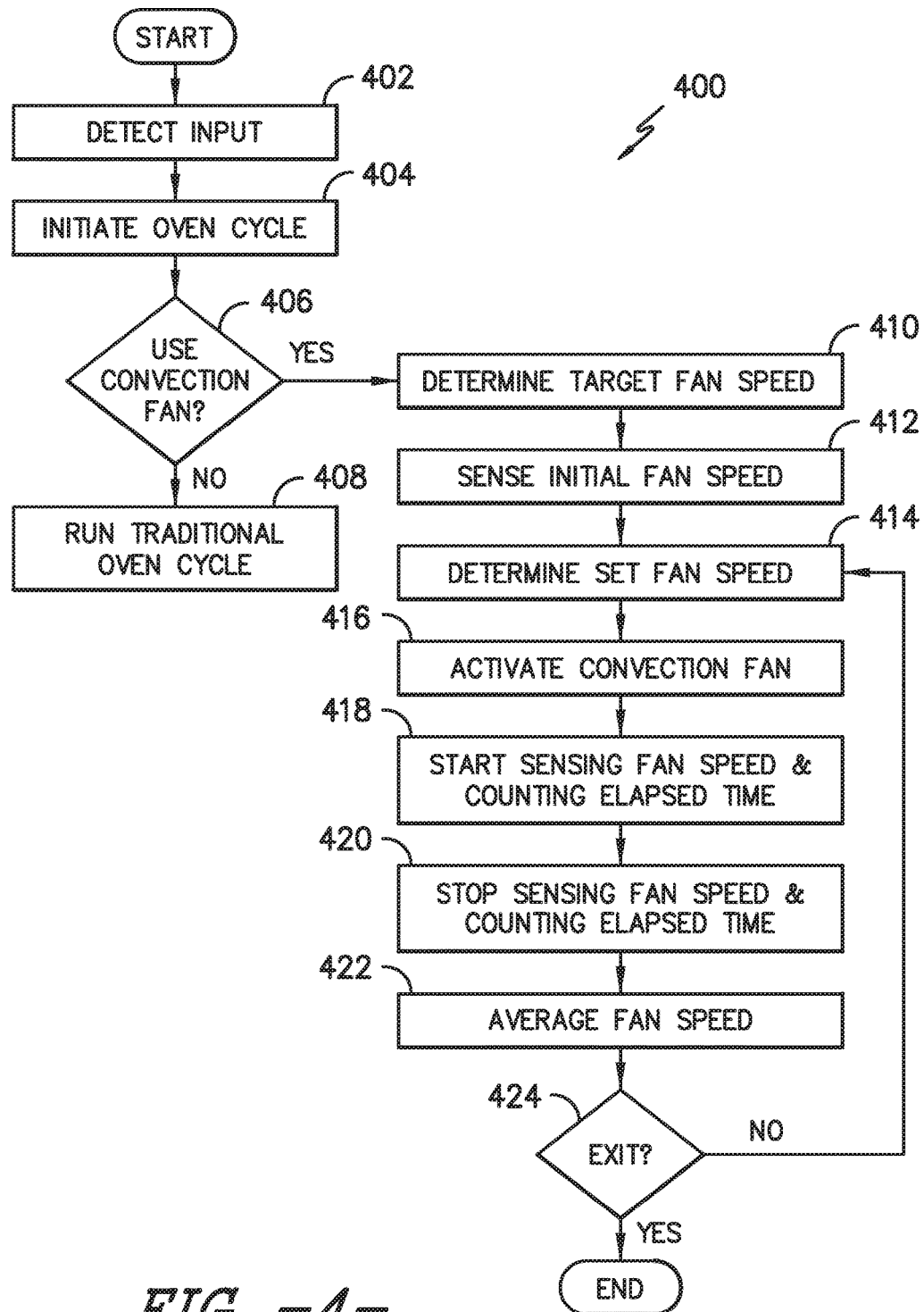
FIG. -4-

OVEN APPLIANCE AND A METHOD FOR OPERATING AN OVEN APPLIANCE

FIELD OF THE INVENTION

The subject matter of the present disclosure relates generally to an oven appliance and a method for operating an oven appliance.

BACKGROUND OF THE INVENTION

Oven appliances generally include a cabinet that defines a cooking chamber for cooking food items therein, such as by baking or broiling the food items. To heat the cooking chamber for cooking, oven appliances include one or more heating elements positioned at a top portion, bottom portion, or both of the cooking chamber. Some oven appliances also include a convection heating element and fan for convection cooking cycles. The heating element or elements may be used for various cycles of the oven appliance, such as a preheat cycle, a cooking cycle, or a self-cleaning cycle.

During a typical preheat cycle, the air and surfaces of the cooking chamber are heated to a set temperature, creating a heating environment within the cooking chamber for cooking food items that is maintained during the cooking cycle, for example, by regulating the airflow in the cooking chamber, to cook the food items. Variations in the airflow within the cooking chamber due to one or more occurrences or operating conditions, such as, e.g., opening of the oven door, can alter the heating environment and thereby alter the cooking performance of the cooking chamber. In addition, the airflow provided by the convection fan may vary from oven appliance to oven appliance due to variations in the configuration of each appliance such as, e.g., the maximum speed of the convection fan motor and the mounting of the fan blades, among convection fans such that the precise airflow characteristics of a given fan are unpredictable. However, controlling the airflow within the cooking chamber can help maintain the cooking performance of the cooking chamber.

Accordingly, an oven appliance with features for controlling airflow within a cooking chamber of the oven appliance would be desirable. Further, a method with features for operating an oven appliance to control airflow within a cooking chamber of the oven appliance would be beneficial. Such features that account for variations in the operating conditions and configuration of the oven appliance would be advantageous.

BRIEF DESCRIPTION OF THE INVENTION

The present invention provides an oven appliance with one or more features for controlling airflow within a cooking chamber of the oven appliance. Further, a method for operating an oven appliance to control airflow within a cooking chamber of the oven appliance is provided. In particular, the oven includes features for and the method includes steps for dynamic control of the speed of a convection fan over an oven cycle to maintain proper airflow within the cooking chamber for cooking performance of the cooking chamber. Additional aspects and advantages of the invention will be set forth in part in the following description, may be apparent from the description, or may be learned through practice of the invention.

In a first exemplary embodiment, a method for operating an oven appliance is provided. The oven appliance includes a cooking chamber for receipt of food items for cooking The method includes the steps of: determining a target speed for a convection fan; sensing an initial speed of the convection fan; determining a time $t_{on}$ for the convection fan to be active during a duty cycle having a duration of time $t_{duty}$; activating the convection fan; starting to sense the speed of the convection fan; deactivating the convection fan; stopping sensing the speed of the convection fan; ascertaining the average speed of the convection fan over the duty cycle; determining whether to continue operating the convection fan and, if so, then returning to the step of determining the time $t_{on}$ for the convection fan to be active during a duty cycle.

In a second exemplary embodiment, a method for operating an oven appliance is provided. The oven appliance includes a cooking chamber for receipt of food items for cooking The method includes the steps of: determining a target speed for a convection fan; sensing an initial speed of the convection fan; determining a set speed for the convection fan for a duty cycle having a duration of time $t_{duty}$; activating the convection fan; starting to sense the speed of the convection fan; stopping sensing the speed of the convection fan; ascertaining the average speed of the convection fan over the duty cycle; determining whether to continue operating the convection fan and, if so, then returning to the step of determining the set speed for the convection fan for a duty cycle.

In a third exemplary embodiment, an oven appliance is provided. The oven appliance includes a cabinet, the cabinet defining a cooking chamber configured for receipt of food items for cooking; a convection fan; a sensor for sensing the speed of the convection fan; and a controller in operative communication with the convection fan and the sensor. The controller is configured for determining a target speed for a convection fan; sensing an initial speed of the convection fan; determining a time $t_{on}$ for the convection fan to be active during a duty cycle having a duration of time $t_{duty}$; activating the convection fan; starting to sense the speed of the convection fan; deactivating the convection fan; stopping sensing the speed of the convection fan; ascertaining the average speed of the convection fan over the duty cycle; determining whether to continue operating the convection fan and, if so, then returning to the step of determining the time $t_{on}$ for the convection fan to be active during a duty cycle.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a front view of an exemplary embodiment of an oven appliance of the present subject matter.

FIG. 2 is a cross-sectional view of the oven appliance of FIG. 1 taken along the 2-2 line of FIG. 1.

FIG. 3 provides a chart illustrating an exemplary method for operating an oven appliance according to the present subject matter.

FIG. 4 provides a chart illustrating another exemplary method for operating an oven appliance according to the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to FIGS. 1 and 2, for this exemplary embodiment, oven appliance 100 includes an insulated cabinet 102 with an interior cooking chamber 104 defining a cavity C defined by a top wall 112, a bottom wall 114, a back wall 116, and opposing side walls 118. Cooking chamber 104 is configured for the receipt of one or more food items to be cooked. Oven appliance 100 includes a door 108 pivotally mounted at a front wall 148, e.g., with one or more hinges (not shown), to cabinet 102 at the opening 106 of cabinet 102 to permit selective access to cooking chamber 104 through opening 106. A handle 110 is mounted to door 108 and assists a user with opening and closing door 108. For example, a user can pull on handle 110 to open or close door 108 and access cooking chamber 104.

Oven appliance 100 can include a seal (not shown) between door 108 and cabinet 102 that assists with maintaining heat and cooking fumes within cooking chamber 104 when door 108 is closed as shown in FIGS. 1 and 2. Multiple parallel glass panes 122 provide for viewing the contents of cooking chamber 104 when door 108 is closed and assist with insulating cooking chamber 104. A baking rack 142 is positioned in cooking chamber 104 for the receipt of food items or utensils containing food items. Baking rack 142 is slidably received onto embossed ribs or sliding rails 144 such that rack 142 may be conveniently moved into and out of cooking chamber 104 when door 108 is open.

A heating element at the top, bottom, or both of cooking chamber 104 provides heat to cooking chamber 104 for cooking Such heating element(s) can be gas, electric, microwave, or a combination thereof. For example, in the embodiment shown in FIG. 2, oven appliance 100 includes a top heating element 124 and a bottom heating element 126, where bottom heating element 126 is positioned adjacent to and below bottom wall 114. Other configurations with or without wall 114 may be used as well.

Oven appliance 100 also has a convection heating element 136 and convection fan 138 positioned adjacent back wall 116 of cooking chamber 104. Convection fan 138 is powered by a convection fan motor 139. Further, convection fan 138 can be a variable speed fan—meaning the speed of fan 138 may be controlled or set anywhere between and including, e.g., 0 and 100 percent. In certain embodiments, oven appliance 100 may also include a bidirectional triode thyristor (not shown), i.e., a triode for alternating current (triac), to regulate the operation of convection fan 138 such that the speed of fan 138 may be adjusted during operation of oven appliance 100, e.g., during a preheat or cooking cycle. The speed of convection fan 138 can be determined by, and communicated to, fan 138 by controller 140. In addition, a sensor 137 such as, e.g., a rotary encoder, a Hall effect sensor, or the like, may be included at the base of fan 138, for example, between fan 138 and motor 139 as shown in the exemplary embodiment of FIG. 2, to sense the speed of fan 138. The speed of fan 138 may be measured in, e.g., revolutions per minute ("RPM").

Oven appliance 100 includes a user interface 128 having a display 130 positioned on an interface panel 132 and having a variety of controls 134. Interface 128 allows the user to select various options for the operation of oven 100 including, e.g., temperature, time, and/or various cooking and cleaning cycles. Operation of oven appliance 100 can be regulated by a controller 140 that is operatively coupled, i.e., in communication with, user interface 128, heating elements 124, 126, and other components of oven 100 as will be further described.

For example, in response to user manipulation of the user interface 128, controller 140 can operate the heating element(s). Controller 140 can receive measurements from a temperature sensor 146 placed in cooking chamber 104 and, e.g., provide a temperature indication to the user with display 130. Controller 140 can also be provided with other features as will be further described herein.

Controller 140 may include a memory and one or more processing devices such as microprocessors, CPUs, or the like, such as general or special purpose microprocessors operable to execute programming instructions or microcontrol code associated with operation of oven appliance 100. The memory may represent random access memory such as DRAM or read only memory such as ROM or FLASH. In one embodiment, the processor executes programming instructions stored in memory. The memory may be a separate component from the processor or may be included onboard within the processor. Controller 140 may also be or include the capabilities of either a proportional (P), proportional-integral (PI), or proportional-integral-derivative (PID) control.

Controller 140 may be positioned in a variety of locations throughout oven appliance 100. In the illustrated embodiment, controller 140 is located next to user interface 128 within interface panel 132. In other embodiments, controller 140 may be located under or next to the user interface 128 otherwise within interface panel 132 or at any other appropriate location with respect to oven appliance 100. In the embodiment illustrated in FIG. 1, input/output ("I/O") signals are routed between controller 140 and various operational components of oven appliance 100 such as heating elements 124, 126, 136, convection fan 138, controls 134, display 130, sensor 146, alarms, and/or other components as may be provided. In one embodiment, user interface 128 may represent a general purpose I/O ("GPIO") device or functional block.

Although shown with touch type controls 134, it should be understood that controls 134 and the configuration of oven appliance 100 shown in FIG. 1 is provided by way of example only. More specifically, user interface 128 may include various input components, such as one or more of a variety of electrical, mechanical, or electro-mechanical input devices including rotary dials, push buttons, and touch pads. User interface 128 may include other display components, such as a digital or analog display device designed to provide operational feedback to a user. User interface 128 may be in communication with controller 140 via one or more signal lines or shared communication busses.

While oven 100 is shown as a wall oven, the present invention could also be used with other cooking appliances such as, e.g., a stand-alone oven, an oven with a stove-top, or other configurations of such ovens.

Oven appliance 100 may have several oven cycles, such as, e.g., a preheat cycle and a cooking cycle. Generally, the preheat cycle ensures the cooking chamber is thermally "soaked," such that the air temperature in the center of the cooking chamber has reached the set or cooking temperature and the surfaces of the cooking chamber are heated to a temperature for radiation heat transfer from the surfaces. The cooking cycle may include, e.g., one or more of a baking cycle, a broiling cycle, and/or a convection cycle.

Improved preheating and cooking performance may be gained by increasing the airflow within cooking chamber 104 using, e.g., convection fan 138 driven by convection fan motor 139. However, because of variations in the operating conditions of oven appliance 100—such as, e.g., loading of cooking chamber 104, differences in the set temperature from one oven cycle to another, and temperature changes during a given oven cycle, due to, e.g., a user opening door 108 during the cycle—it may be desirable to vary the speed of fan 138 during and between oven cycles to achieve an optimal airflow within chamber 104. Further, it may be advantageous for a control to adjust the speed of fan 138 to account for variations in fans 138 and fan motors 139, such as, e.g., maximum speed of motors 139 and the mounting of the blades of fan 138, between oven appliances 100. That is, the operating conditions or capabilities may differ from one oven appliance 100 to another, and a control sequence, algorithm, or the like that minimizes variations in performance among ovens 100 may be desirable.

FIG. 3 illustrates an exemplary method of operating oven appliance 100. Method 300 may be performed in whole or in part by controller 140 or any other suitable device or devices. At step 302, controller 140 detects one or more inputs, e.g., by a user of oven appliance 100. Such inputs may include, for example, a cooking mode, such as, e.g., bake, broil, or convect; a cooking temperature; and duration of the cooking mode and/or an oven cycle. Controller 140 or other suitable devices may detect other inputs as well.

At step 304, an oven cycle is initiated. The oven cycle may be, e.g., a preheat cycle or a cooking cycle of oven appliance 100. Then, at step 306, controller 140 determines whether the oven cycle requires the use of a convection fan, such as fan 138. Controller 140 may determine that fan 138 is required or should be used based on, e.g., one or more inputs detected at step 302. For example, a user of oven appliance 100 may select a convection cooking mode, which input may be detected at step 302. If fan 138 is not to be used, at step 308 the oven cycle is run or completed in a traditional way, i.e., without operating convection fan 138 as described herein.

However, if fan 138 is to be used, method 300 proceeds to step 310, where a target speed for fan 138 is determined. The target speed may be, e.g., the revolutions per minute at which fan 138 should operate for optimum cooking conditions within cooking chamber 104 of oven appliance 100. The target speed may vary between oven cycles based on, e.g., the inputs detected at step 302 such as cooking mode and temperature. Additionally, the target speed may be less than a rated speed for fan motor 139 to account for variations in a production quantity of motors 139.

After the target fan speed is determined, an initial speed of fan 138 may be sensed, as shown at step 312 in FIG. 3. The fan speed may be sensed using sensor 137, which may be, e.g., a rotary encoder or Hall effect sensor as described above. Sensor 137 may be in operative communication with controller 140 such that the initial fan speed is communicated to controller 140. Then, at step 314, controller 140 determines a time $t_{on}$ that fan 138 should be operated during a duty cycle. That is, during the oven cycle, convection fan 138 may be operated in a duty cycle having a duration of time $t_{duty}$, such that fan 138 is activated or on for a portion of the time $t_{duty}$ and fan 138 is deactivated or off for the remaining portion of time $t_{duty}$. The portion of the time $t_{duty}$ that fan 138 is on is time $t_{on}$. When step 314 is performed before an average fan speed is determined as described below, time $t_{on}$ may be determined using the target fan speed and the initial fan speed, for example, by comparing the target fan speed to the initial fan speed.

After time $t_{on}$ is determined, method 300 proceeds to step 316 and convection fan 138 is activated. In some embodiments, fan 138 may be activated before method 300 reaches step 316, e.g., fan 138 may be activated before method 300 begins and may still be active when method 300 reaches step 316. In such embodiments, controller 140 may determine at step 316 that fan 138 is active or has been activated, and method 300 may proceed to step 318. At step 318, sensor 137 starts sensing the speed of convection fan 138 and controller 140 starts counting the time elapsed. That is, the duty cycle may begin when fan 138 is activated such that controller 140 may start counting the time elapsed during the duty cycle when fan 138 is activated. At step 320, convection fan 138 is deactivated. Thus, step 320 occurs at time $t_{on}$, i.e., when controller 140 counts that time $t_{on}$ has elapsed. At step 322, sensor 137 stops sensing fan speed and controller 140 stops counting the time elapsed; therefore, step 322 occurs at time $t_{duty}$, i.e., at the completion of the duty cycle. Therefore, fan 138 is deactivated or off for the period of time between time $t_{on}$ and time $t_{duty}$, if there is a period of time between $t_{on}$ and $t_{duty}$, i.e., if $t_{on}$ is not equal to $t_{duty}$.

Using the speed of fan 138 sensed over the duty cycle, at step 324 controller 140 averages the fan speed to ascertain an average fan speed. Next, controller 140 may determine whether to exit the loop or method 300, e.g., if oven appliance 100 has been turned off or the oven cycle has been stopped, interrupted, or completed. Although shown as step 326, controller 140 may continuously monitor whether a signal or input to exit method 300 has been received such that controller 140 may exit the method at any point within the loop.

If controller 140 determines that the loop should not be exited, method 300 may return to step 314 and controller 140 may determine the time $t_{on}$ that fan 138 should be activated during the duty cycle. When step 314 is repeated after determining the average fan speed, time $t_{on}$ may be determined using the target fan speed and the average fan speed, for example, by comparing the target fan speed to the average fan speed. In some embodiments, controller 140 may determine that a larger or longer time $t_{on}$, compared to the previous time $t_{on}$, may be needed if the average fan speed is less than the target fan speed or, conversely, a smaller or shorter time $t_{on}$, compared to the previous time $t_{on}$, may be needed if the average fan speed is more than the target fan speed. Time $t_{on}$ may be determined in other ways as well.

Thus, by looping back to step 314 after each duty cycle, time $t_{on}$ may vary throughout the oven cycle, as the initial fan speed may differ from the average fan speed, and the average fan speed may differ over each duty cycle due to various noise parameters such as, e.g., the loading of oven 100, opening of door 108 during the oven cycle, and/or temperature variations throughout the oven cycle. That is, time ton may vary from one duty cycle to the next to bring the speed of fan 138 over the duty cycle closer to the target speed or to maintain the fan speed over the duty cycle at or near the target speed. Further, the duration or time $t_{duty}$ of the duty cycle may be selected during the manufacture of oven appliance 100, during the installation of oven 100, or at different times during the life of oven 100. Time $t_{duty}$ may be based on, e.g., the structure, construction, and/or configuration of oven 100, including the size or volume of cooking chamber 104, the number and configuration of heating elements (such as heating elements 124, 126, 136), and the available operating parameters such as cooking mode and temperature. An exemplary time $t_{duty}$ is approximately 60 seconds, but other times $t_{duty}$ may be used as well.

FIG. 4 illustrates another exemplary method of operating oven appliance 100. Method 400 may be performed in whole or in part by controller 140 or any other suitable device or devices. Method 400 may be used in, e.g., an oven appliance 100 having a variable speed convection fan 138, where a triac or other suitable device may adjust the speed of fan 138 throughout an oven cycle rather than cycling fan 138 on and off.

At step 402, controller 140 detects one or more inputs, e.g., by a user of oven appliance 100. Such inputs may include, for example, a cooking mode, such as, e.g., bake, broil, or convect; a cooking temperature; and duration of the cooking mode and/or an oven cycle. Controller 140 or other suitable devices may detect other inputs as well.

At step 404, an oven cycle is initiated. The oven cycle may be, e.g., a preheat cycle or a cooking cycle of oven appliance 100. Then, at step 406, controller 140 determines whether the oven cycle requires the use of a convection fan, such as fan 138. Controller 140 may determine that fan 138 is required or should be used based on, e.g., one or more inputs detected at step 402. For example, a user of oven appliance 100 may select a convection cooking mode, which input may be detected at step 402. If fan 138 is not to be used, at step 408 the oven cycle is run or completed in a traditional way, i.e., without operating convection fan 138 as described herein.

However, if fan 138 is to be used, method 400 proceeds to step 410, where a target speed for fan 138 is determined. The target speed may be, e.g., the revolutions per minute at which fan 138 should operate for optimum cooking conditions within cooking chamber 104 of oven appliance 100. The target speed may vary between oven cycles based on, e.g., the inputs detected at step 402 such as cooking mode and temperature. Additionally, the target speed may be less than a rated speed for fan motor 139 to account for variations in a production quantity of motors 139.

After the target fan speed is determined, an initial speed of fan 138 may be sensed, as shown at step 412 in FIG. 4. The fan speed may be sensed using sensor 137, which may be, e.g., a rotary encoder or Hall effect sensor as described above. Sensor 137 may be in operative communication with controller 140 such that the initial fan speed is communicated to controller 140. Then, at step 414, controller 140 determines a set speed at which fan 138 should be operated during a duty cycle. That is, during the oven cycle, convection fan 138 may be operated in a duty cycle having a duration of time $t_{duty}$, such that fan 138 is operated at the set speed for the time $t_{duty}$. When step 414 is performed before an average fan speed is determined as described below, the set speed may be determined using the target fan speed and the initial fan speed, for example, by comparing the target fan speed to the initial fan speed.

After the set speed is determined, method 400 proceeds to step 416 and convection fan 138 is activated. In some embodiments, fan 138 may be activated before method 400 reaches step 416, e.g., fan 138 may be activated before method 400 begins and may still be active when method 400 reaches step 416, or as described below, fan 138 may have been activated in a previous iteration of the control loop. In such embodiments, controller 140 may determine at step 416 that fan 138 is active or has been activated, and method 400 may proceed to step 418. At step 418, sensor 137 starts sensing the speed of convection fan 138 and controller 140 starts counting the time elapsed. That is, the duty cycle may begin when fan 138 is activated and controller 140 starts counting the time elapsed during the duty cycle when fan 138 is activated. At step 420, sensor 137 stops sensing fan speed and controller 140 stops counting the time elapsed; therefore, step 420 occurs at time $t_{duty}$, i.e., at the completion of the duty cycle.

Using the speed of fan 138 sensed over the duty cycle, at step 422 controller 140 averages the fan speed to ascertain an average fan speed. Although fan 138 is operated at a set speed throughout the duty cycle, as described, variations in the conditions within cooking chamber 104 or the configuration of fan 138 may affect the fan speed over the duty cycle such that the average fan speed differs from the set speed. After determining the average fan speed, controller 140 may determine whether to exit the loop or method 400, e.g., if oven appliance 100 has been turned off or the oven cycle has been stopped, interrupted, or completed. Although shown as step 424, controller 140 may continuously monitor whether a signal or input to exit method 400 has been received such that controller 140 may exit the method at any point within the loop.

If controller 140 determines that the loop should not be exited, method 400 may return to step 414 and controller 140 may determine the set speed at which fan 138 should be operated during the duty cycle. When step 414 is repeated after determining the average fan speed, the set speed may be determined using the target fan speed and the average fan speed, for example, by comparing the target fan speed to the average fan speed. In some embodiments, controller 140 may determine that a higher or faster set speed, compared to the previous set speed, may be needed if the average fan speed is less than the target fan speed or, conversely, a lower or slower set speed, compared to the previous set speed, may be needed if the average fan speed is more than the target fan speed. The set speed of fan 138 may be determined in other ways as well.

Thus, by looping back to step 414 after each duty cycle, the set speed may vary throughout the oven cycle, as the initial fan speed may differ from the average fan speed, and the average fan speed may differ over each duty cycle due to various noise parameters such as, e.g., the loading of oven 100, opening of door 108 during the oven cycle, and/or temperature variations throughout the oven cycle. That is, for each duty cycle, the speed of fan 138 may be adjusted to bring the speed closer to the target speed or to maintain the speed at or near the target speed. Moreover, as previously described, the duration or time $t_{duty}$ of the duty cycle may be selected during the manufacture of oven appliance 100, during the installation of oven 100, or at different times during the life of oven 100. Time $t_{duty}$ may be based on, e.g., the structure, construction, and/or configuration of oven 100, including the size or volume of cooking chamber 104, the number and configuration of heating elements (such as heating elements 124, 126, 136), and the available operating parameters such as cooking mode and temperature. An exemplary time $t_{duty}$ is approximately 60 seconds, but other times $t_{duty}$ may be used as well.

Using methods 300, 400, or variations thereof, controller 140 (or any other suitable device or devices) can dynamically adjust the speed of convection fan 138 throughout an oven cycle to maintain proper airflow within cooking chamber 104 for optimum cooking performance. By sensing the speed of fan 138, controller 140 may detect the effect of various noise parameters on the speed of fan 138 and/or airflow within chamber 104, and controller 140 accordingly may adjust the fan speed to account for the variations. In this way, controller 140 can maintain a proper airflow within chamber 104 based on the actual airflow rather than various proxies for indicating changes to airflow, such as, e.g., opening of door 108 or changes in the temperature within chamber 104, which can impact cooking performance by, e.g., over- or under-driving fan 138 or the like.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for operating an oven appliance, the oven appliance including a cooking chamber for receipt of food items for cooking, the method comprising the steps of:
   determining a target speed for a convection fan;
   sensing an initial speed of the convection fan;
   determining a time $t_{on}$ for the convection fan to be active during a duty cycle having a duration of time $t_{duty}$;
   activating the convection fan;
   starting to sense the speed of the convection fan;
   deactivating the convection fan;
   stopping sensing the speed of the convection fan;
   ascertaining the average speed of the convection fan over the duty cycle;
   determining whether to continue operating the convection fan and, if so, then returning to the step of determining the time $t_{on}$ for the convection fan to be active during a duty cycle.

2. The method of claim 1, further comprising the step of determining whether use of the convection fan is required and, if so, then proceeding to the step of determining the target speed.

3. The method of claim 1, wherein the step of starting to sense the speed of the convection fan further comprises starting to count the time elapsed during the duty cycle.

4. The method of claim 1, wherein the step of deactivating the convection fan occurs at time $t_{on}$.

5. The method of claim 1, wherein the step of stopping sensing the speed of the convection fan occurs at time $t_{duty}$.

6. The method of claim 1, wherein the step of determining the time $t_{on}$ for the convection fan to be active during a duty cycle comprises comparing the initial speed of the convection fan to the target speed.

7. The method of claim 1, wherein the step of determining the time $t_{on}$ for the convection fan to be active during a duty cycle comprises comparing the average speed of the convection fan to the target speed.

8. A method for operating an oven appliance, the oven appliance including a cooking chamber for receipt of food items for cooking, the method comprising the steps of:
   determining a target speed for a convection fan;
   sensing an initial speed of the convection fan;
   determining a set speed for the convection fan for a duty cycle having a duration of time $t_{duty}$;
   activating the convection fan;
   starting to sense the speed of the convection fan;
   stopping sensing the speed of the convection fan;
   ascertaining the average speed of the convection fan over the duty cycle;
   determining whether to continue operating the convection fan and, if so, then returning to the step of determining the set speed for the convection fan for a duty cycle.

9. The method of claim 8, wherein the step of starting to sense the speed of the convection fan further comprises starting to count the time elapsed during the duty cycle.

10. The method of claim 8, further comprising the step of detecting an input mode and temperature prior to the step of determining the target speed.

11. The method of claim 8, wherein the step of stopping sensing the speed of the convection fan occurs at time $t_{duty}$.

12. The method of claim 8, wherein the step of determining the set speed for the convection fan for a duty cycle comprises comparing the initial speed of the convection fan to the target speed.

13. The method of claim 8, wherein the step of determining the set speed for the convection fan for a duty cycle comprises comparing the average speed of the convection fan to the target speed.

14. An oven appliance, comprising:
   a cabinet, the cabinet defining a cooking chamber configured for receipt of food items for cooking;
   a convection fan;
   a sensor for sensing the speed of the convection fan; and
   a controller in operative communication with the convection fan and the sensor, the controller configured for
      determining a target speed for a convection fan;
      sensing an initial speed of the convection fan using the sensor;
      determining a time $t_{on}$ for the convection fan to be active during a duty cycle;
      activating the convection fan;
      starting to sense the speed of the convection fan using the sensor;
      deactivating the convection fan;
      stopping sensing the speed of the convection fan;
      determining an average speed of the convection fan over the duty cycle;
      determining whether to continue operating the convection fan and, if so, then
         returning to the step of determining the time $t_{on}$ for the convection fan to be active during a duty cycle.

15. The oven appliance of claim 11, wherein the sensor for sensing the speed of the convection fan is a rotary encoder.

16. The oven appliance of claim 11, wherein the controller is configured for deactivating the convection fan at time $t_{on}$.

17. The oven appliance of claim 11, wherein the controller is configured for stopping sensing the speed of the convection fan at time $t_{duty}$.

18. The oven appliance of claim 11, wherein the step of determining the time $t_{on}$ for the convection fan to be active during a duty cycle comprises comparing the initial speed of the convection fan to the target speed.

19. The oven appliance of claim 11, wherein the step of determining the time $t_{on}$ for the convection fan to be active during a duty cycle comprises comparing the average speed of the convection fan to the target speed.

* * * * *